(12) United States Patent
Kato et al.

(10) Patent No.: US 11,990,809 B2
(45) Date of Patent: May 21, 2024

(54) DYNAMOELECTRIC MACHINE HAVING A STRUCTURE FOR COOLANT WHICH ENTERS A MICRO GAP BETWEEN WINDINGS

(71) Applicant: HONDA MOTOR CO., LTD., Tokyo (JP)

(72) Inventors: Shinji Kato, Wako (JP); Fumiya Nishii, Wako (JP); Masaru Sora, Wako (JP); Taku Ueda, Wako (JP); Takashi Wakui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 214 days.

(21) Appl. No.: 17/679,232

(22) Filed: Feb. 24, 2022

(65) Prior Publication Data

US 2022/0302784 A1 Sep. 22, 2022

(30) Foreign Application Priority Data

Mar. 19, 2021 (JP) .................................. 2021-045323

(51) Int. Cl.
| | | |
|---|---|---|
| *H02K 3/24* | (2006.01) | |
| *H02K 1/16* | (2006.01) | |
| *H02K 1/20* | (2006.01) | |
| *H02K 3/12* | (2006.01) | |
| *H02K 3/28* | (2006.01) | |
| *H02K 3/48* | (2006.01) | |

(52) U.S. Cl.
CPC ............... *H02K 3/24* (2013.01); *H02K 1/165* (2013.01); *H02K 1/20* (2013.01); *H02K 3/12* (2013.01); *H02K 3/28* (2013.01); *H02K 3/48* (2013.01)

(58) Field of Classification Search
CPC ............ H02K 1/165; H02K 1/20; H02K 3/12; H02K 3/24; H02K 3/28; H02K 3/48
USPC ................................ 310/60 A, 52, 54, 64, 89
See application file for complete search history.

(56) References Cited

U.S. PATENT DOCUMENTS

| | | | | |
|---|---|---|---|---|
| 10,135,319 | B2 * | 11/2018 | Hanumalagutti | ........ B60K 1/00 |
| 10,910,901 | B2 * | 2/2021 | Burch | ....... H02K 3/38 |
| 11,522,406 | B2 * | 12/2022 | Degner | ..... H02K 3/24 |
| 11,575,291 | B2 * | 2/2023 | Wang | ..... H02K 9/193 |
| 11,728,703 | B2 * | 8/2023 | Grabherr | ................ H02K 9/197 |
| | | | | 310/65 |
| 11,777,352 | B2 * | 10/2023 | Hoerz | .................... H02K 9/197 |
| | | | | 310/65 |
| 2011/0210692 | A1 * | 9/2011 | Nishihama | ........... H02K 17/165 |
| | | | | 310/211 |
| 2012/0126642 | A1 * | 5/2012 | Miyamoto | ............... H02K 3/24 |
| | | | | 310/54 |

(Continued)

FOREIGN PATENT DOCUMENTS

JP 2716286 2/1998

*Primary Examiner* — Rashad H Johnson
(74) *Attorney, Agent, or Firm* — Amin, Turocy & Watson, LLP

(57) ABSTRACT

A dynamoelectric machine includes: a winding; a stator core including a slot in which the winding is installed; a cover part that covers the stator core; and a crossing part that is a space formed between the cover part and the stator core, wherein, in the crossing part, an end portion of the winding in an axial direction is exposed, and a filling member is disposed between a side surface of the winding in a radial direction and an inner side surface of the cover part in the radial direction.

5 Claims, 4 Drawing Sheets

(56) References Cited

U.S. PATENT DOCUMENTS

| | | | |
|---|---|---|---|
| 2013/0270931 A1* | 10/2013 | Handa | H02K 5/10 |
| | | | 310/43 |
| 2016/0329770 A1* | 11/2016 | Ishii | H01F 5/06 |
| 2020/0161917 A1* | 5/2020 | E Silva | H02K 3/24 |
| 2020/0161918 A1* | 5/2020 | Almeida E Silva | H02K 1/165 |
| 2020/0161947 A1* | 5/2020 | Almeida E Silva | H02K 15/105 |
| 2020/0169136 A1* | 5/2020 | Sercombe | H02K 3/24 |
| 2020/0389070 A1* | 12/2020 | Bradfield | H02K 1/20 |
| 2022/0021259 A1* | 1/2022 | Almeida E Silva | H02K 9/19 |
| 2022/0286005 A1* | 9/2022 | Ueda | H02K 3/48 |
| 2022/0302784 A1* | 9/2022 | Kato | H02K 1/20 |

\* cited by examiner

DYNAMOELECTRIC MACHINE HAVING A STRUCTURE FOR COOLANT WHICH ENTERS A MICRO GAP BETWEEN WINDINGS

CROSS-REFERENCE TO RELATED APPLICATION

Priority is claimed on Japanese Patent Application No. 2021-045323, filed on Mar. 19, 2021, the contents of which are incorporated herein by reference.

BACKGROUND

Field of the Invention

The present invention relates to a dynamoelectric machine.

Background

In a motor for a hybrid vehicle and an electric automobile, a cooling technique may be used in which a motor winding is submerged in a coolant for the purpose of improving cooling performance over water cooling (using a water jacket) or oil dropping cooling in the related art (Japanese Patent No. 2716286).

SUMMARY

For the above-mentioned invention, a crossing part (a space) is formed between a stator core and a cover. In the crossing part, the coolant may flow into a useless cavity. Accordingly, cooling performance deteriorates because the coolant does not enter a micro gap between windings. As a result, there is a problem that the crossing part gets hot.

An aspect of the present invention is directed to providing a dynamoelectric machine having a structure capable of ensuring that a coolant enters a micro gap between windings.

A dynamoelectric machine according to a first aspect of the present invention includes a winding; a stator core including a slot in which the winding is installed; a cover part that covers the stator core; and a crossing part that is a space formed between the cover part and the stator core, wherein, in the crossing part, an end portion of the winding in an axial direction is exposed, and a filling member is disposed between a side surface of the winding in a radial direction and an inner side surface of the cover part in the radial direction.

According to the first aspect, the filling member is disposed between the side surface of the winding in the radial direction and the inner side surface of the cover part in the radial direction. That is, a cavity of the crossing part is eliminated by the filling member. Accordingly, a coolant can reliably enter the gap between the conducting wires that constitute the winding.

The dynamoelectric machine according to a second aspect may include a shielding member between the winding and the filling member.

Depending on the filling member provided between the winding and the cover part, the filling member may intrude into the gap of the winding, and the gap is filled. Accordingly, the coolant cannot enter the gap of the winding.

On the other hand, according to the second aspect, the shielding member is provided between the winding and the filling member. Accordingly, it is possible to avoid the above-mentioned problems.

In a third aspect, the filling member may be a semi-solid resin.

According to the third aspect, the filling member is the semi-solid resin. Accordingly, the filling member can be efficiently provided according to the shape of the cavity between the winding and the cover part.

In a fourth aspect, the filling member may contain a foaming agent.

According to the fourth aspect, the filling member contains the foaming agent. Accordingly, the foaming agent foams when the filling member is provided in the cavity of the crossing part, so that the cavity of the crossing part can be completely filled.

A dynamoelectric machine according to a fifth aspect of the present invention includes: a winding; a stator core including a slot in which the winding is installed; a cover part that covers the stator core; and a crossing part formed by the cover part and the stator core, wherein a gap between a side surface of the winding in a radial direction and an inner side surface of the cover part in the radial direction is smaller than a gap between conducting wires that constitute the winding.

According to the fifth aspect, the gap between the side surface of the winding in the radial direction and the inner side surface of the cover part in the radial direction is smaller than the gap between the conducting wires that constitute the winding. Accordingly, in the inside of the cover part, the coolant can easily flow between the conducting wires that constitute the winding. Accordingly, cooling efficiency in the winding by the coolant can be improved.

In a sixth aspect, the side surface of the winding in the radial direction may come into contact with the inner side surface of the cover part in the radial direction.

According to the sixth aspect, the side surface of the winding in the radial direction comes in contact with the inner side surface of the cover part in the radial direction. Accordingly, the cavity of the crossing part can be eliminated according to the shape of the cover part. Accordingly, the coolant can reliably enter the gap between the conducting wires that constitute the winding.

In a seventh aspect, the cover part may have a protrusion part protruding toward the winding.

According to the seventh aspect, the cover part has the protrusion part protruding toward the winding. Accordingly, in the crossing part, only the protrusion part can come in contact with the winding. Accordingly, for example, by changing the shape of only the cover part with respect to the existing product, it is possible to receive the benefit of effects according to the aspect of the present invention.

A dynamoelectric machine according to an eighth aspect of the present invention includes: a winding; a stator core including a slot in which the winding is installed; a cover part that covers the stator core; and a crossing part formed by the cover part and the stator core, wherein, in the winding, an occupation ratio of a portion located on the crossing part is lower than an occupation ratio of a portion located in the slot.

According to the eighth aspect, in the winding, the occupation ratio of the portion located on the crossing part is lower than the occupation ratio of the portion located in the slot. In the portion located on the crossing part of the winding, by widening the gap provided in the winding, the coolant can easily be allowed to enter the inside of the winding.

According to an aspect of the present invention, it is possible to provide a dynamoelectric machine having a structure capable of causing a coolant to reliably enter a micro gap between windings.

DESCRIPTION OF EMBODIMENTS

Hereinafter, a dynamoelectric machine 100 according to an embodiment of the present invention will be described with reference to the accompanying drawings.

Figure 1:
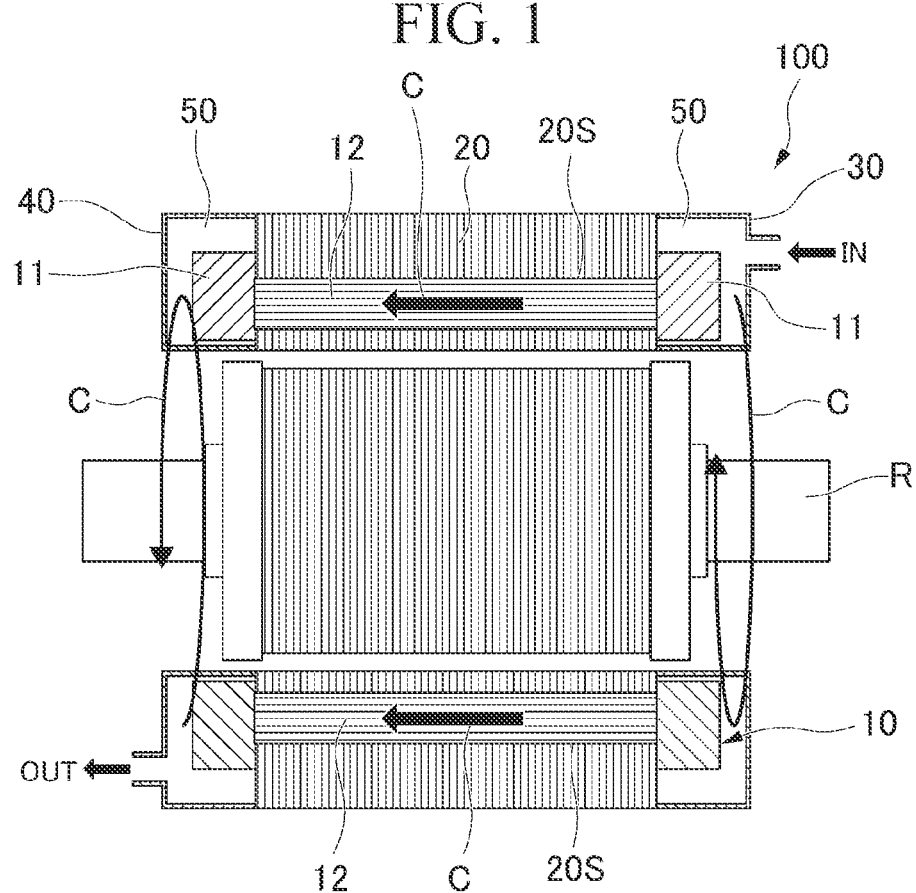
FIG. 1 is a cross-sectional view showing a dynamoelectric machine according to an embodiment of the present invention.
Figure 2:
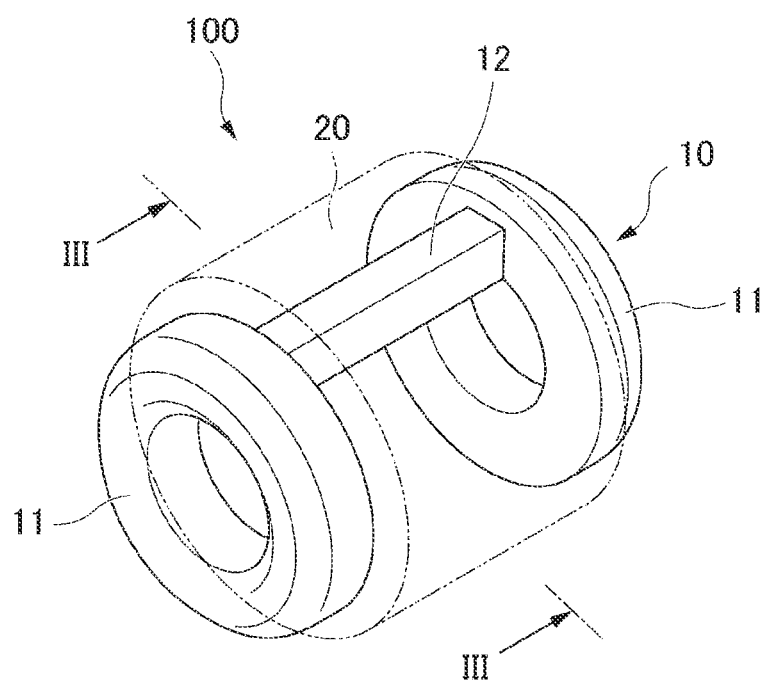
FIG. 2 is a schematic view showing a winding according to the embodiment of the present invention.

As shown in FIG. 1 and FIG. 2, the dynamoelectric machine 100 includes a winding 10, a stator core 20, a first cover part 30 (a cover part), a second cover part 40 (a cover part), a crossing part 50, and a rotor R.

The dynamoelectric machine 100 is, for example, a motor used in a hybrid vehicle or an electric automobile.

The dynamoelectric machine 100 generates a magnetic force through electric conduction to the winding 10 included in the stator core 20, and rotates the rotor R. The rotor R is a rotary shaft of the dynamoelectric machine 100. The rotor R has magnetism. The rotor R is rotated by a magnetic force generated through electric conduction to the winding 10.

Figure 3:
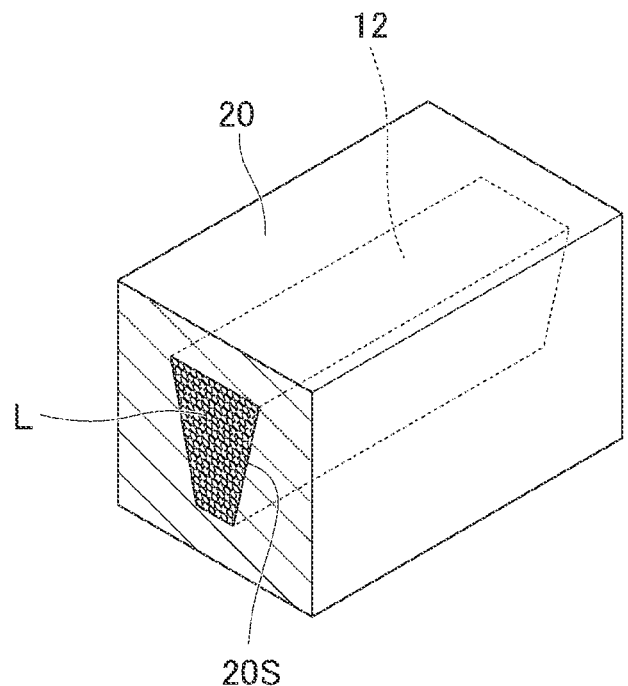
FIG. 3 is an enlarged cross-sectional view of a straight wire in the winding shown in FIG. 2.

The winding 10 is a bundle of a conducting wire L. As shown in FIG. 2 and FIG. 3, the winding 10 includes crossover wires 11 and a straight wire 12.

The crossover wires 11 are areas located at both end portions of the stator core 20 in an axial direction. The crossover wires 11 are portions of the winding 10 protruding from a slot 20S (to be described below) of the stator core 20.

The straight wire 12 is an area installed in the slot 20S of the stator core 20. The straight wire 12 is provided in the plurality of slots 20S provided at intervals in a circumferential direction of the stator core 20. That is, the plurality of straight wires 12 are provided at intervals in the circumferential direction of the stator core 20. In addition, as described above, the crossover wires 11 are portions of the winding 10 protruding from the slots 20S of the stator core 20. Accordingly, the plurality of crossover wires 11 are also provided at intervals in the circumferential direction of the stator core 20. In addition, an outer wire of the conducting wire L can be preferably 0.1 mm to 3 mm.

The stator core 20 is a cylindrical member. The stator core 20 accommodates the rotor R in the cylindrical interior. For example, an electromagnetic steel plate is appropriately used in the stator core 20. The slots 20S are provided at intervals in a cylindrical inner circumferential surface of the stator core 20 in an annular shape.

The slots 20S are provided in a linear shape in a lengthwise direction of the stator core 20. As shown in FIG. 3, the slots 20S are formed in a trapezoidal shape in a cross section perpendicular to the lengthwise direction of the stator core 20. The straight wire 12 of the winding 10 is provided in the slots 20S.

The first cover part 30 covers one end portion of the stator core 20 in the axial direction. Accordingly, it prevents the crossover wires 11 of the winding 10 protruding from one end portion of the stator core 20 from being exposed to the outside, and configures the crossing part 50 when a coolant C circulates in the stator core 20 (to be described below).

The second cover part 40 covers the other end portion of the stator core 20. Accordingly, it prevents the crossover wires 11 of the winding 10 protruding from the other end portion of the stator core 20 from being exposed to the outside, and configures the crossing part 50 when the coolant C circulates in the stator core 20.

The crossing part 50 is a space formed by the first cover part 30 or the second cover part 40 and the stator core 20. As shown in FIG. 4, FIG. 5, FIG. 6 and FIG. 7, the crossover wires 11 of the winding 10 are located in the crossing part 50. The coolant C that cools the winding 10 circulates in the crossing part 50.

The coolant C cools the winding 10 in which heat is generated by electric conduction. In the embodiment, for example, a general automatic transmission fluid (ATF) is appropriately used as the coolant C. The coolant C flows through a gap between the conducting wires L of the crossover wires 11 and the straight wire 12 of the winding 10 in the crossing part 50 and the slots 20S, and thus the winding 10 is cooled.

As described in FIG. 1, the coolant C circulates in the dynamoelectric machine 100. That is, first, the coolant C intrudes into the crossing part 50 on the side of the first cover part 30 from an inlet IN provided in the first cover part 30. First, the crossing part 50 on the side of the first cover part 30 is filled with the coolant C. Accordingly, the crossover wire 11 on the side of the first cover part 30 is cooled.

Next, the coolant C is moved from the crossing part 50 on the side of the first cover part 30 to the slots 20S of the stator core 20. Accordingly, the straight wire 12 is cooled. The coolant C passing through the slots 20S is moved to the crossing part 50 on the side of the second cover part 40. After that, the crossing part 50 on the side of the second cover part 40 is filled with the coolant C. Accordingly, the crossover wire 11 on the side of the second cover part 40 is cooled.

When the crossing part 50 on the side of the second cover part 40 is filled with the coolant C, the coolant C is discharged from an outlet OUT provided in the second cover part 40.

The coolant C discharged from the outlet OUT is cooled by an oil cooler or the like (not shown), and then, enters the crossing part 50 on the side of the first cover part 30 from the inlet IN again using a pump or the like (not shown).

Figure 7:
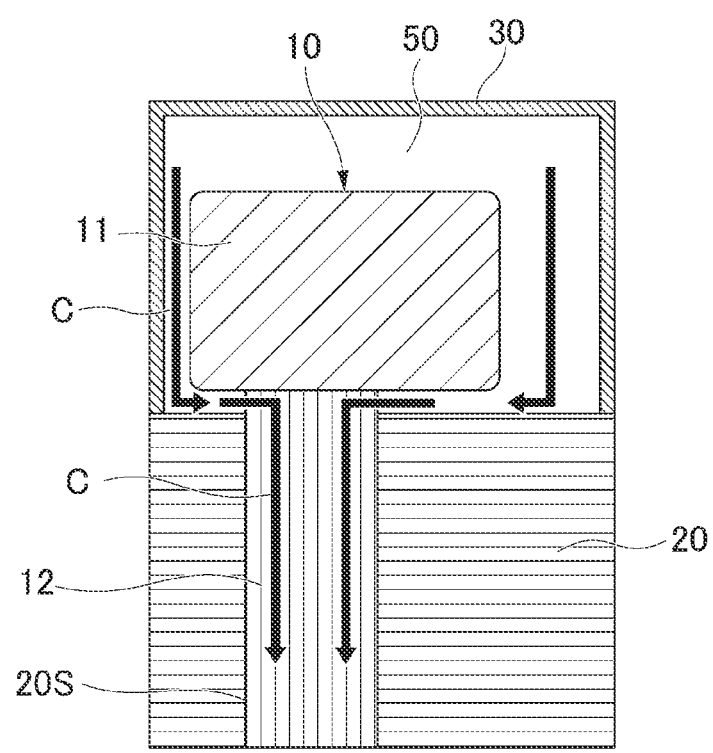
FIG. 7 is an enlarged cross-sectional view showing the flow path for a coolant when a filling member of FIG. 4 is not provided.

In circulation of the above-mentioned coolant C, when the coolant C cools the winding 10, the coolant *C comes* in direct contact with the conducting wire L that constitutes the winding 10. Accordingly, the heat of the conducting wire L is transferred to the coolant C. Here, as shown in FIG. 7, when the coolant C moves to the slots 20S without passing through the crossover wires 11, the conducting wire L in the crossover wires 11 does not come in contact with the coolant C, and thus, sufficient cooling performance is not obtained.

When an interval between the conducting wires L of the winding 10 is narrow, depending on the viscosity of the coolant C, the coolant C does not enter the inside of the conducting wire L sufficiently. Further, in the crossing part 50, when there is a route (a cavity) that allows the coolant C to move to the slots 20S without passing through the crossover wires 11, the coolant C naturally moves to the slots 20S through the route.

Hereinafter, a structure in which the coolant C comes in contact with the crossover wires 11 reliably will be exemplarily described using the shape of the first cover part 30. Further, the following description of the shape of the first cover part 30 and the crossing part 50 is also applicable to the shape of the second cover part 40.

Figure 4:
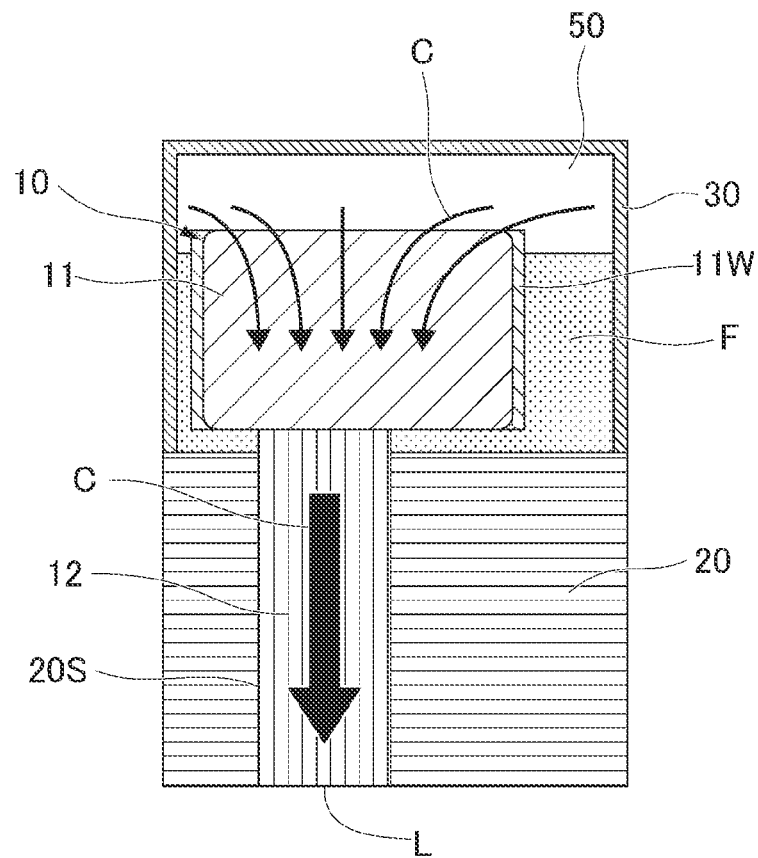
FIG. 4 is an enlarged cross-sectional view showing a flow path for a coolant in a crossing part of the embodiment.

In the crossing part 50 shown in FIG. 4, an end portion of the winding 10 in the axial direction of the stator core 20 is exposed, and a filling member F is disposed between a side surface of the winding 10 in the radial direction and an inner side surface of the first cover part 30 in the radial direction. That is, the cavity between the side surface of the winding 10 in the radial direction and the inner side surface of the first cover part 30 in the radial direction is eliminated by the filling member F. Accordingly, the coolant C cannot move to the slots 20S unless the coolant C passes through the crossover wires 11.

A semi-solid resin such as an epoxy-based thermosetting resin or the like is preferably used in the filling member F. In addition, the filling member F can preferably contain a foaming agent such as an epoxy-based foaming resin. Accordingly, the cavity of the crossing part 50 is completely filled with the filling member F, the coolant C passes through the crossover wires 11 reliably.

When the filling member F is provided in the crossing part 50, the filling member F may intrude into the gap between the conducting wires L of the crossover wires 11 according to viscosity of the filling member F. The gap between the conducting wires L to which the coolant C should be supplied is filled with the filling member F, causing the coolant C to be unable to enter the gap.

For this reason, as shown in FIG. 4, preferably, a shielding member 11W may be provided between the crossover wires 11 and the filling member F. Accordingly, the filling member F is prevented from intruding into the gap between the conducting wires L of the crossover wires 11. For example, a known wrap film is preferably used for the shielding member 11W.

As shown in FIG. 4, the shielding members 11W can be provided preferably at least at both side surfaces of the crossover wires 11 in the radial direction of the stator core 20. More preferably, the shielding member 11W can be provided on a surface on a side facing the stator core 20 in the axial direction of the stator core 20. In addition, in order to secure an inflow passage of the coolant C to the crossover wires 11, the shielding member 11W cannot be preferably provided on a surface on a side facing the first cover part 30 in the axial direction of the stator core 20.

Figure 5:
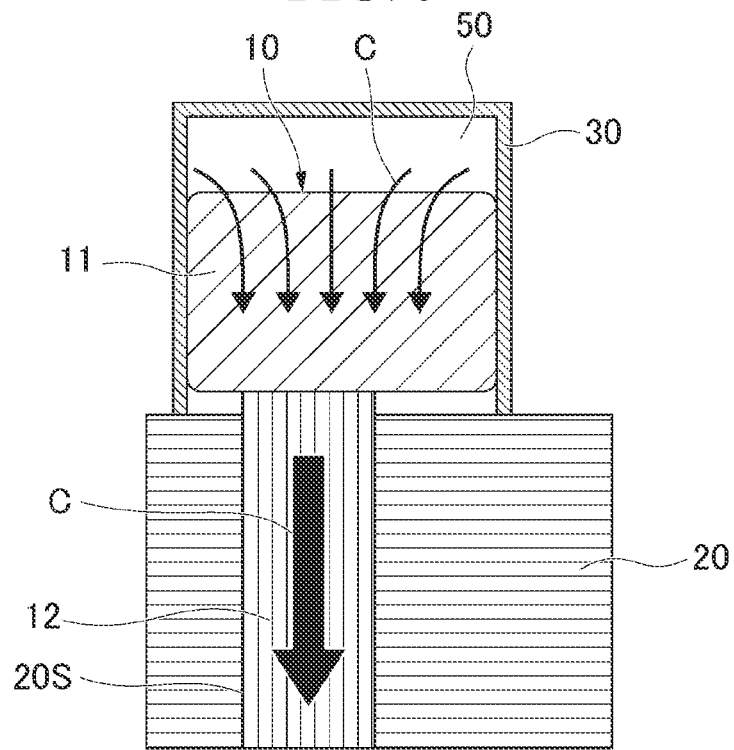
FIG. 5 is a modified example in which a cover part of FIG. 4 is made smaller.

In addition, as shown in FIG. 5, by reducing the first cover part 30, a gap between the side surface of the winding 10 in the radial direction of the crossover wires 11 and the inner side surface of the first cover part 30 in the radial direction may be smaller than the gap between the conducting wires L that constitute the winding 10. Alternatively, the side surface of the crossover wire 11 in the radial direction may come in contact with the inner side surface of the first cover part 30 in the radial direction. Accordingly, if there is no gap inside the crossing part 50 that is greater than the gap between the conducting wires L of the crossover wires 11, the coolant C moves to the slots 20S through the crossover wires 11.

Figure 6:
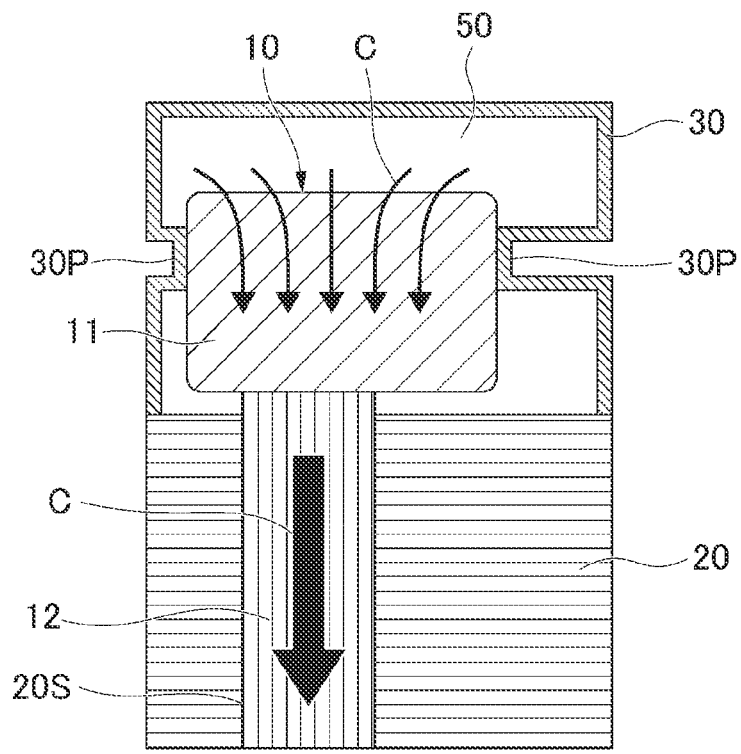
FIG. 6 is a modified example in which a protrusion part is provided on the cover part of FIG. 4.

In addition, as shown in FIG. 6, a protrusion part 30P is provided on the first cover part 30, and the protrusion part 30P may come in contact with the crossover wires 11. Even with such a shape, the coolant C passes through the crossover wires 11 and moves to the slots 20S.

In addition, since the gap between the conducting wires L of the crossover wires 11 is increased, the coolant C may easily pass through the gap between the conducting wires L of the crossover wires 11. That is, an occupation ratio of the crossover wires 11 may be greater than an occupation ratio of the straight wire 12 located in the slots 20S. Here, the occupation ratio is referred to as a density of the conducting wires L per unit area in a cross section of the winding 10. In the embodiment, the crossover wire 11 is a cross section parallel to the axial direction of the stator core 20. In addition, the straight wire 12 is a cross section perpendicular to the axial direction of the stator core 20. This can be applied to any one of shapes of the first cover shown in the above-mentioned FIG. 4, FIG. 5 and FIG. 6.

As described above, according to the dynamoelectric machine 100 of the embodiment, the filling member F is disposed between the side surface of the winding 10 in the radial direction and the inner side surfaces of the first cover part 30 and the second cover part 40 in the radial direction. That is, the cavity of the crossing part 50 is eliminated by the filling member F. Accordingly, the coolant C can reliably enter the gap between the conducting wires L that constitute the winding 10.

Depending on the filling member F provided between the winding 10 and the first cover part 30 and the second cover part 40, the filling member F intrudes into the gap of the winding 10 to fill the gap. Accordingly, the coolant C cannot enter the gap of the winding 10.

On the other hand, the shielding member 11W is provided between the winding 10 and the filling member F. Accordingly, it is possible to avoid the above-mentioned problems.

In addition, the filling member F is a semi-solid resin. Accordingly, the filling member F can be efficiently provided according to the shape of the cavity between the winding 10 and the first cover part 30 and the second cover part 40.

In addition, the filling member F contains a foaming agent. Accordingly, since the foaming agent is foamed when the filling member F is provided in the cavity of the crossing part 50, the cavity of the crossing part 50 can be completely filled.

In addition, the gap between the side surface of the winding 10 in the radial direction and the inner side surfaces of the first cover part 30 and the second cover part 40 in the radial direction is smaller than the gap between the conducting wires L that constitute the winding 10. Accordingly, in the first cover part 30 and the second cover part 40, the coolant C can easily flow between the conducting wires L that constitute the winding 10. Accordingly, cooling efficiency in the winding by the coolant C can be improved.

In addition, the side surface of the winding 10 in the radial direction comes in contact with the inner side surfaces of the first cover part 30 and the second cover part 40 in the radial direction. Accordingly, the cavity of the crossing part can be eliminated according to the shapes of the first cover part 30 and the second cover part 40. Accordingly, the coolant C can reliably enter the gap between the conducting wires L that constitute the winding 10.

In addition, the first cover part 30 and the second cover part 40 have the protrusions 30P protruding toward the winding 10. Accordingly, in the crossing part 50, only the protrusion part 30P can come in contact with the winding 10. Accordingly, for example, by changing the shapes of only the first cover part 30 and the second cover part 40 with respect to the existing product, effects according to the embodiment of the present invention can be enjoyed.

In addition, in the winding 10, the occupation ratio of the area located on the crossing part 50 is lower than the occupation ratio of the area located in the slots 20S. In the area located on the crossing part 50 of the winding 10, by widening the gap having the winding 10, the coolant C can easily enter the winding 10.

Further, the technical scope of the present invention is not limited to the embodiment, and various modifications may be made without departing from the spirit of the present invention.

For example, while the protrusion part 30P protrudes at a right angle from the first cover part 30 toward the crossover wire 11 in FIG. 6, the protrusion may protrude in a tapered shape.

In addition, the components in the embodiment may be appropriately replaced with known components without departing from the scope of the present invention, and further, the above-mentioned variants may be appropriately combined.

What is claimed is:

1. A dynamoelectric machine comprising:
a winding;
a stator core including a slot in which the winding is installed;
a cover part that covers the stator core; and
a crossing part that is a space formed between the cover part and the stator core,
wherein, in the crossing part, an end portion of the winding in an axial direction is exposed, and a filling member is disposed between a side surface of the winding in a radial direction and an inner side surface of the cover part in the radial direction,
the dynamoelectric machine comprises: a shielding member between the winding and the filling member, and the filling member is a semi-solid resin containing a foaming agent.

2. A dynamoelectric machine comprising:
a winding;
a stator core including a slot in which the winding is installed;
a cover part that covers the stator core; and
a crossing part formed by the cover part and the stator core,
wherein a gap between a side surface of the winding in a radial direction and an inner side surface of the cover part in the radial direction is smaller than a gap between conducting wires that constitute the winding.

3. The dynamoelectric machine according to claim 2,
wherein the side surface of the winding in the radial direction comes into contact with the inner side surface of the cover part in the radial direction.

4. The dynamoelectric machine according to claim 2,
wherein the cover part has a protrusion part protruding toward the winding.

5. A dynamoelectric machine comprising:
a winding;
a stator core including a slot in which the winding is installed;
a cover part that covers the stator core; and
a crossing part formed by the cover part and the stator core,
wherein the winding is a bundle of conducting wires and includes a first wire located in the crossing part and a second wire located in the slot,
a gap between the conducting wires of the first wire is larger than a gap between the conducting wires of the second wire, and
an occupation ratio of the first wire of the winding is lower than an occupation ratio of the second wire of the winding.

* * * * *